United States Patent [19]

Chadwick

[11] Patent Number: 5,836,426
[45] Date of Patent: Nov. 17, 1998

[54] ROLL BRAKE

[75] Inventor: Dennis P. Chadwick, Napanee, Canada

[73] Assignee: Chadwick Engineering Limited, Kingston, Canada

[21] Appl. No.: 779,435

[22] Filed: Jan. 7, 1997

[51] Int. Cl.$^6$ ............................................. B60T 1/00
[52] U.S. Cl. .............................. 188/29; 188/67; 414/911
[58] Field of Search ..................... 188/29, 67, 151 R, 188/212; 280/11.2, 11.22; 414/911

[56] References Cited

U.S. PATENT DOCUMENTS

| 5,213,467 | 5/1993 | Harms | 414/911 X |
| 5,308,217 | 5/1994 | Pienta | 414/911 X |
| 5,320,367 | 6/1994 | Landis | 280/11.2 |

FOREIGN PATENT DOCUMENTS

| 4034198 | 4/1992 | Germany | 414/911 |
| 138481 | 1/1961 | U.S.S.R. | 414/911 |
| 2023078 | 12/1979 | United Kingdom | 414/911 |
| 2025869 | 1/1980 | United Kingdom | 414/911 |

*Primary Examiner*—Peter M. Poon
*Attorney, Agent, or Firm*—Richard J. Hicks

[57] ABSTRACT

A roll brake to prevent relative movement between a pair of rolls, one or both of which may be driven, in a coil wrapping machine or the like is described. A metal brake plank is placed under each end of each roll in a respective pair of parallel rolls and an air bag actuator is placed intermediate each end of each plank and the roll frame. For rotation of the rolls during wrapping the air bags are deflated but when a new coil is loaded onto the rolls the airbags are inflated thus driving the planks into locking relationship with the rotatable rolls and thus preventing any relative rotational movement therebetween.

7 Claims, 2 Drawing Sheets

ROLL BRAKE

CROSS REFERENCE TO RELATED APPLICATION

This application is related to my earlier filed U.S. patent application Ser. No. 08/643,750 filed 6 May 1996, the disclosure of which is incorporated herein by reference.

FIELD OF INVENTION

This invention relates to a roll brake for use with a pair of support rollers, one or both of which are driven, in a coil wrapping machine or the like. More particularly this invention relates to an air actuated locking brake for simultaneous immobilization of both rolls in a pair thereof.

BACKGROUND OF INVENTION

Coil wrapping machines are, of course, well known in the art and many designs are commercially available to facilitate either "through-the-eye" wrapping or "cocoon wrapping", as desired. A typical machine is described in detail in my earlier filed US Patent Application identified above. In all cases a relatively heavy coil of metal strip, such as aluminum or steel strip is lifted onto a pair of rolls, one or both of which are driven, so that it may be axially rotated about a horizontal axis during the wrapping operation. While the total weight of the coil may be as much as 15 to 20 tons, the strip material itself may be very light gauge and easily damaged if not loaded on the rolls with perfect alignment. As a practical matter, it is difficult for an operator to place the coil on both of the rolls simultaneously and with the coil axis exactly parallel to the axes of the rolls. Almost inevitably, one end of the coil contacts the rolls slightly ahead of the other end of the coil contacting the rolls. Due to the contact of the coil to the rolls applying opposing torques to the rolls, hence the rolls turn slightly inwardly and tend to pull up slack in the outer turn or wrap of that end of the coil. When the other end of the coil contacts the rolls no further movement of the rolls can take place as they are already loaded and hence no slack is pulled up. Since the coil now rests on the rolls with slack at one end thereof tapering to no slack at the other end, when the coil is then rotated on the rolls, the excess material at the one end tends to form a crease or fold thereby damaging the outer layer or wrap which may have to be discarded before the coil material can be used. This may be a time consuming and expensive operation to say nothing of the waste of material. There is a need therefore, for a means to ensure that the rolls are locked against relative rotation in the event that one end of the coil contacts the rolls ahead of the other end thereof. Transmission brakes have been found insufficient for this purpose as there is always sufficient play in the transmission to permit small movements of one roll relative to the other.

OBJECT OF INVENTION

Thus, one object of the present invention is to provide a roll brake which simultaneously locks both rolls against axial rotation relative to each other. Preferably, but not essentially the roll brake is an air actuated friction brake.

BRIEF DESCRIPTION OF INVENTION

By one aspect of this invention there is provided a roll brake assembly for selectively locking a pair of axially rotatable parallel roll members, mounted in a frame, so as to prevent relative movement therebetween, comprising: at least one planar member overlying and extending between said parallel roll members perpendicular to the longitudinal axes thereof and intermediate said roll members and said frame, and actuating means intermediate said planar member and said frame to selectively raise said planar member into locking engagement with said parallel roll members so as to prevent movement thereof, and lower said planar member out of contact with said parallel roll members so as to allow rotation thereof.

BRIEF DESCRIPTION OF DRAWINGS

FIG. 1 is a plan view of a pair of drive rolls as used in a coil wrapping machine or the like;

DETAILED DESCRIPTION OF PREFERRED EMBODIMENTS

Figure 1:
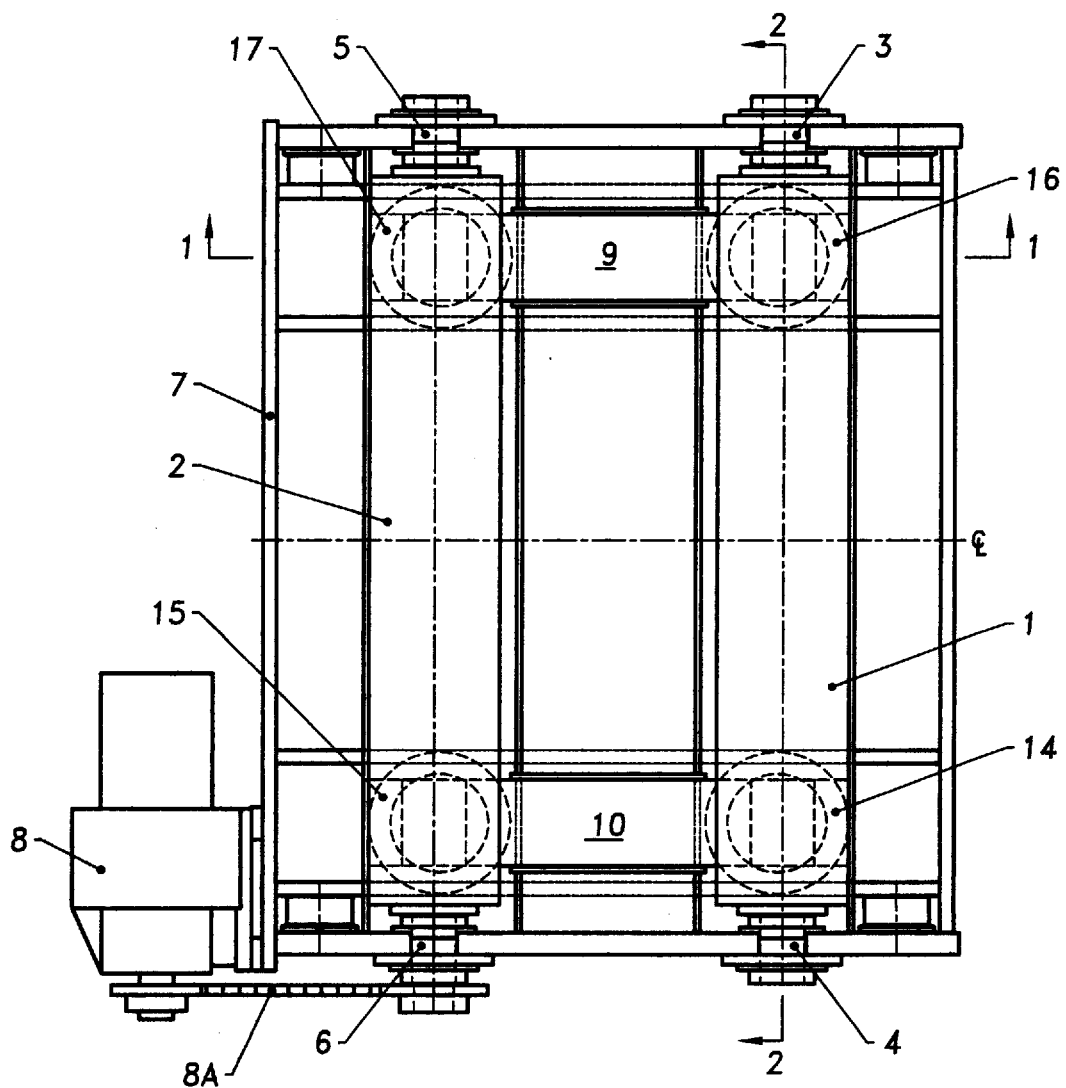
Figure 2:
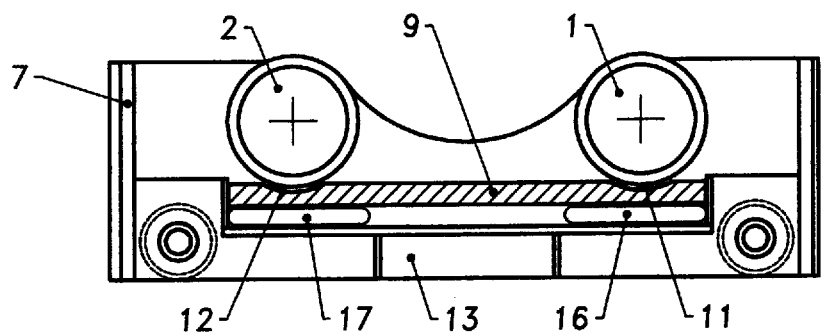
FIG. 2 is a side view of the rolls of FIG. 1 taken along the section line 1—1.
Figure 3:
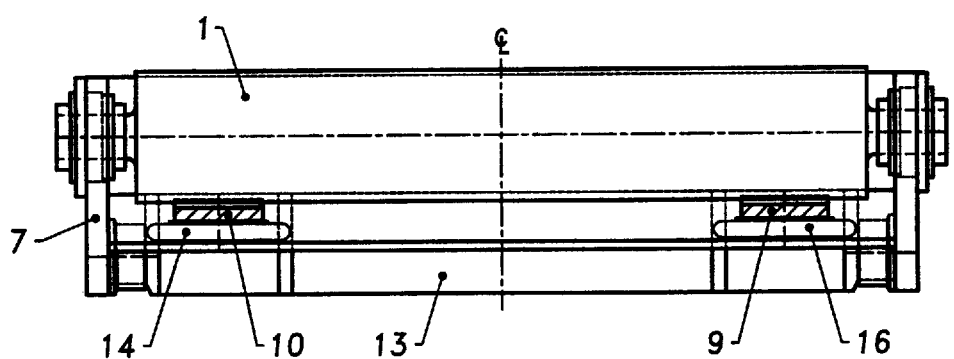
FIG. 3 is an end view of the rolls of FIG. 1 taken along section line 2—2.

As seen in FIG. 1, a pair of rolls 1,2 are mounted in parallel horizontal relationship in bearings 3,4,5 and 6 respectively in a roll frame 7. Roll 1 is axially rotated by drive motor and gearbox 8 in conventional manner via a roller chain and sprocket drive 8A. Metal roll brake planks 9,10 are placed under respective ends of rolls 1,2 perpendicular to the axes of rotation of rolls 1,2, as seen more clearly in FIGS. 2 and 3. Each plank is provided with a pair of roll engaging grooves or troughs 11,12 (as seen in FIG. 2). Intermediate brake planks 9,10 and respective portions of the base 13 of frame 7 there are provided four circular inflatable air bags 14, 15, 16, 17. Air bags 14,15,16 and 17 are operatively connected to an air supply (not shown) via pneumatic lines (not shown). In operation, rolls 1,2 are freely rotatable by motor and gearbox 8 when the air bags 14,15,16 and 17 are deflated so that troughs 11, 12 are disengaged from the roll surface. When it is desired to load a new coil onto the rolls for wrapping or the like, the air bags are inflated thereby raising planks 9,10 and forcing grooves 11,12 into contact with rolls 1,2 and thus locking them rigidly and preventing any relative movement therebetween. A coil can then be placed onto rolls 1,2 with assurance that no slack in the outer wrap of the coil material will be pulled up due to relative movement of the rolls.

It will be appreciated by those skilled in the art that many modifications within the scope of the appended claims are possible. For example, while this invention has thus far been described with reference to the use of air bags, other actuator means to raise and lower planks 9,10 could equally well be employed, such as mechanical actuators. Other means for preventing relative rotation of the rolls such as disc brakes or drum brakes may also be employed.

I claim:

1. A roll brake assembly for selectively locking a pair of axially rotatable parallel roll members, mounted in a frame, so as to prevent relative opposite rotational movement therebetween comprising: at least one planar member extending under said parallel roll members perpendicular to the longitudinal axes thereof and intermediate said roll members and said frame, and actuating means intermediate said planar member and said frame to selectively raise said planar member into locking engagement with said parallel roll members so as to prevent said relative opposite rotational movement therebetween and lower said planar member out of contact with said parallel roll members so as to allow rotation thereof.

2. A roll brake assembly as claimed in claim 1, including at least two said planar members.

3. A roll brake assembly as claimed in claim 1 wherein said actuating means comprise air bag means.

4. A roll brake assembly as claimed in claim 3 including air bag means at each end of each said planar member.

5. A roll brake assembly as claimed in claim 3 including means to inflate and deflate said air bag means.

6. A roll brake assembly as claimed in claim 1 wherein said actuating means comprise mechanical actuating means.

7. A roll brake assembly as claimed in claim 1, wherein said planar member includes contour groove means adapted to engage a peripheral surface of said roll members.

* * * * *